(12) United States Patent
Matsumoto et al.

(10) Patent No.: US 7,794,281 B2
(45) Date of Patent: Sep. 14, 2010

(54) CARD CONNECTOR

(75) Inventors: Yasuyoshi Matsumoto, Yamato (JP); Junichi Miyazawa, Yokohama (JP); Mitsuhiro Tomita, Yamato (JP); Hisato Takase, Tokyo (JP); Ayako Ida, Yamato (JP)

(73) Assignee: Molex Incorporated, Lisle, IL (US)

( * ) Notice: Subject to any disclaimer, the term of this patent is extended or adjusted under 35 U.S.C. 154(b) by 77 days.

(21) Appl. No.: 12/224,463

(22) PCT Filed: Mar. 2, 2007

(86) PCT No.: PCT/US2007/005487

§ 371 (c)(1), (2), (4) Date: Dec. 22, 2008

(87) PCT Pub. No.: WO2007/103246

PCT Pub. Date: Sep. 13, 2007

(65) Prior Publication Data

US 2009/0221184 A1   Sep. 3, 2009

(51) Int. Cl.
*H01R 24/00* (2006.01)

(52) U.S. Cl. .................................. 439/630

(58) Field of Classification Search .......... 439/629, 439/630, 633, 188; 455/457, 458
See application file for complete search history.

(56) References Cited

U.S. PATENT DOCUMENTS

| | | | |
|---|---|---|---|
| 6,749,450 B1 | 6/2004 | Chen | |
| 7,123,886 B2 * | 10/2006 | Morita | 455/90.3 |
| 7,238,052 B2 * | 7/2007 | Wang et al. | 439/630 |
| 7,377,814 B2 * | 5/2008 | Shen et al. | 439/630 |
| 7,488,214 B2 * | 2/2009 | Tanaka et al. | 439/630 |
| 2001/0039129 A1 * | 11/2001 | Nishimura | 439/74 |
| 2001/0053634 A1 * | 12/2001 | Camacho | 439/630 |
| 2004/0127081 A1 | 7/2004 | Chou | |

FOREIGN PATENT DOCUMENTS

| | | |
|---|---|---|
| DE | 20 2004 008661 | 8/2004 |
| JP | 2003-017189 | 1/2003 |

OTHER PUBLICATIONS

International Search Report for PCT/US2007/005487.

* cited by examiner

*Primary Examiner*—Chandrika Prasad
(74) *Attorney, Agent, or Firm*—Timothy M. Morella

(57) ABSTRACT

A card connector is configured for receiving a generally rectangular card therein. The card has contact pads and generally parallel first and second sides with a cut-away portion formed in the first side in proximity to a front end of the card. The cut-away portion includes a short length extending from the front end generally parallel to the first side, and a tapered shoulder part extending from the short length to the first side. The connector includes an insulative housing with first and second spaced apart sidewalls that define a cavity therein for receiving the card in an insertion direction. A tapered surface is provided adjacent the first sidewall to guide an improperly inserted card at an angle to the insertion direction and a second sidewall recess is formed in the second sidewall to permit entrance of a corner part of such improperly inserted card. A plurality of electrically conductive terminals are mounted in the housing and configured to engage the contact pads of the card upon proper insertion of the card into the housing. A metal shell is also mounted on the housing.

12 Claims, 12 Drawing Sheets

CARD CONNECTOR

FIELD OF THE INVENTION

The present invention relates to a connector for a card and, more particularly, a connector for receiving a miniature card.

BACKGROUND OF THE INVENTION

Conventionally, electronic equipments, such as personal computers, portable or mobile telephones, PDAs (personal digital assistants), digital cameras, video cameras, music players, game machines, and car navigation systems, are equipped with a card connector adapted for use with a various kinds of memory cards such as an a mini SD® card, a Trans-Flash® card, a micro SD® card, and the like.

Recently, a rapid miniaturization of electronic equipments creates a tendency of a rapid miniaturization of memory cards and card connectors. The card connector tends to be disposed at a less visible location, such as the side and bottom surfaces of electronic equipment, with the exclusion of locations where members such as a display screen, operation buttons and the like are disposed. Consequently, a card can be inserted upside down, namely improperly. If a card is inserted improperly, the outside area of the card other than its pad may abut against a connecting terminal of a card connector. As a result, the connecting terminal might be incidentally bent or damaged. To this end, there has been proposed a card connector that prevents an improper insertion of a card (for example, refer to Japanese Patent Application Laid-Open (kokai) No. 2004-335172).

FIG. 12 is a perspective view showing a conventional card connector. In FIG. 12, the reference numeral 301 designates a chassis to form a housing of a card connector. The chassis 301 has a base 302 that is a molded component formed of synthetic resin, and a cover 303 formed of a metallic plate and secured to the base 302. An insertion space (not shown), into which a card is inserted, is provided in the chassis 301, and a card insertion opening 304 is formed at the rear end of the casing 301. Guide grooves 305 for guiding a card are formed on both sidewalls of the base 302, respectively. The card inserted from the card insertion opening 304 can be shifted along the guide grooves 305 in the direction indicated by an arrow. A plurality of terminals 308 formed of metal are disposed in the vicinity of the front end of the base 302, so that they come in contact with a face electrode of the card inserted in the inside of the chassis 301 to establish electrical conduction thereto.

The cover 303 is further provided with a faceplate part 306 for covering an open upper surface of the base 302. The faceplate part 306 is provided with an engaging projection 307 for preventing an improper insertion. If a card is inserted upside down, namely improperly, abutment of the engaging projection 307 against the front upper edge of the improperly inserted card holds the card against further travel. This prevents the terminals 308 from being damaged by the improperly inserted card. Meanwhile, if the card is inserted in its proper attitude, the engaging projection 307 is received in a recess part formed near the front end of the upper surface of the card. Therefore, the properly inserted card travels to the front end within the inside of the chassis 301, so that its face electrode comes into mechanical and electrical contact with the terminals 308 and establishes electrical conduction thereto.

Nevertheless, because the above-mentioned conventional card connector has the engaging projection 307 formed in the cover 303, it is required that the recess part for receiving the engaging projection 307 is formed near the front end of the upper surface of the card. It is, however, difficult to form the recess in a card that is small in size and thickness thus making it extremely difficult to use with a small card. Further, the engaging projection 307 is both the primary measure for retaining a correctly inserted card and the measure for preventing incorrect insertion. As a result, a part thereof is subjected to a force exerted by the card upon abutment, so that the engaging projection 307 and the circumference of the engaging projection 307 in the cover 303 might be deformed. Also in the improperly inserted card, a part thereof is subjected to the reaction force from the engaging projection 307, so that portions defining the external wall of the card might be damaged.

SUMMARY OF THE INVENTION

The present invention has been made with a view to solving the above-mentioned problem encountered by the conventional card connector, and has an object thereof to provide a card connector capable of reliably preventing an improper insertion of a card, with such a construction that includes a projecting part projecting from a first sidewall part including a tapered surface that abuts against a tapered shoulder part formed near a front end on a first side of a card, and an engaging recess part formed in a second sidewall part. With this construction, when an improperly inserted card travels along the tapered surface of the projecting part, the shoulder part of the card abuts against a front side end of the second sidewall part and is rotationally moved, so that a corner part on the first side of the front end of the card enters into the engaging recess part and abuts against a receiving part. A further object of the present invention is to provide a card connector able to prevent an improper insertion of a card even if it is small. Namely, a plurality of locations of the card connector are configured to come into abutment against a plurality of locations of an improperly inserted card, so that the card is held against further travel toward inside the card connector. Hence, the card connector is not damaged due to the force exerted by the card, and the card is free of damage.

To satisfy the above-mentioned objects, in accordance with one aspect of the present invention, there is provided a card connector includes: a housing for accommodating therein a card provided with a terminal member, the card being inserted into the housing; a connecting terminal configured to be secured to the housing and capable of being brought into contact with the terminal member of the card; and a case configured to be secured to the housing and provided with a flat part. The card has a first cut-away portion formed near a front end on a first side, and a second side opposing to the first side and extending linearly from a second corner part of the front end to a rear end, the first cut-away portion including a linear part extending linearly from a first corner part of the front end, and a tapered shoulder part connected to a rear end side of the linear part. The housing is provided with a first sidewall part and a second sidewall part that are opposed to a first side and a second side of the card inserted in a proper attitude thereof, respectively, and extend in a direction of insertion of the card; a projecting part that includes a tapered surface configured to abut against the above-mentioned shoulder part, and projects from the first sidewall part toward the second sidewall part; and an engaging recess part formed in the second sidewall part so as to permit entrance of a first corner part of an improperly inserted card.

In accordance with another aspect of the present invention, the card connector has a card guide mechanism, which is provided with a slide member configured to press a card inserted in a proper attitude thereof into the housing, in a direction opposite to a direction of insertion of the card, and an urging member configured to urge the slide member in a direction opposite to the direction of insertion. With the described configuration, when the slide member is stopped at a lock position, and when the slide member is shifted in the direction of insertion of the card and reaches a termination point by a push operation applied to press the card in the insertion direction, the slide member is shifted from the termination point to the direction opposite to the direction of insertion by urging force exerted by the urging member, thereby discharging the card. The slide member includes the projecting part.

In accordance with a still other aspect of the present invention, the card connector is provided with such a configuration that each of the first sidewall part and the second sidewall part has, at a front side end thereof in the direction of insertion, a second side abutting part and a shoulder abutting part configured to permit abutments of a second side and a shoulder part of an improperly inserted card, respectively.

In accordance with a still other aspect of the present invention, the card connector is configured in such a manner that a length from the shoulder abutting part to the engaging recess part is longer than a length of the linear part.

In accordance with a still other aspect of the present invention, the card connector is configured in such a manner that the engaging recess part has a depth thereof larger than a radius of the first corner part.

In accordance with a still other aspect of the present invention, the card connector is configured in such a manner that a length from the second side abutting part to the tapered surface is shorter than a length of the linear part.

In accordance with a still other aspect of the present invention, the card connector is configured in such a manner that the housing has a recess part formed on a further inner side in the direction of insertion than the engaging recess part, and the case has a first supporting part engaged with the recess part.

In accordance with a still other aspect of the present invention, the card connector is configured in such a manner that the housing has a recess part formed at the second side abutting part, and the case has a second supporting part engaged with the recess part.

In accordance with a still other aspect of the present invention, a card connector includes: a housing for accommodating therein a card provided with a terminal member, the card being inserted into the housing; a connecting terminal configured to be secured to the housing and capable of being brought into contact with the terminal member of the card; and a case configured to be secured to the housing and provided with a flat part. The card has a first cut-away portion formed near a front end on a first side, and a second side opposing the first side and extending linearly from a second corner part of the front end to a rear end. A first side edge of the card connector is provided with an engaging part engaged with a first cut-away portion of a card inserted in a proper attitude thereof. The engaging part includes a tilted surface that allows an improperly inserted card to shift to a second side edge of the card connector. The second side edge is provided with a shoulder abutting part configured to abut against a shoulder part of a first cut-away portion of the improperly inserted card and allows the card to be tilted, and a receiving part configured to abut against the front end of the card.

In accordance with a still other aspect of the present invention, the card connector is configured in such a manner that the first side edge is further provided with a holding part configured to abut against a second side of an improperly inserted card, so that the card is supported by the receiving part and the holding part.

The card connector according to the present invention has the projecting part projecting from the first sidewall part including the tapered surface configured to abut against the tapered shoulder part formed near the front end on the first side of the card, and the engaging recess part formed at the second sidewall part. Therefore, if an improperly inserted card travels along the tapered surface of the projecting part, the shoulder part of the card abuts against the front side end of the second sidewall part and is rotated, so that the corner part of the first side at the front end of the card enters into the engaging recess part and comes into abutment against the receiving part. Thus, a plurality of locations of the card connector is capable of abutting against a plurality of locations of the improperly inserted card, so that the card is prevented from further travel. Hence, there is no possibility of causing damage to the card connector due to the force exerted by the card, and damage to the card per se. It is, therefore, possible to prevent reliably an improper insertion of a small card.

DESCRIPTION OF THE PREFERRED EMBODIMENTS

Preferred embodiments of the present invention will be described below in detail with reference to the accompanying drawings.

Referring to FIGS. 1-4, a card connector 10 of the preferred embodiment is mounted on a substrate 21, such as a printed circuit board provided in electronic equipment (not shown). A card 31 is inserted into the card connector 10, so that the card 31 is mounted in the electronic equipment via the card connector 10. For example, the electronic equipment may be any type of equipment such as a personal computer, a portable or mobile telephone, a PDA, a digital camera, a video camera, a music player, a game machine, a car navigation system, or the like.

Figure 3:
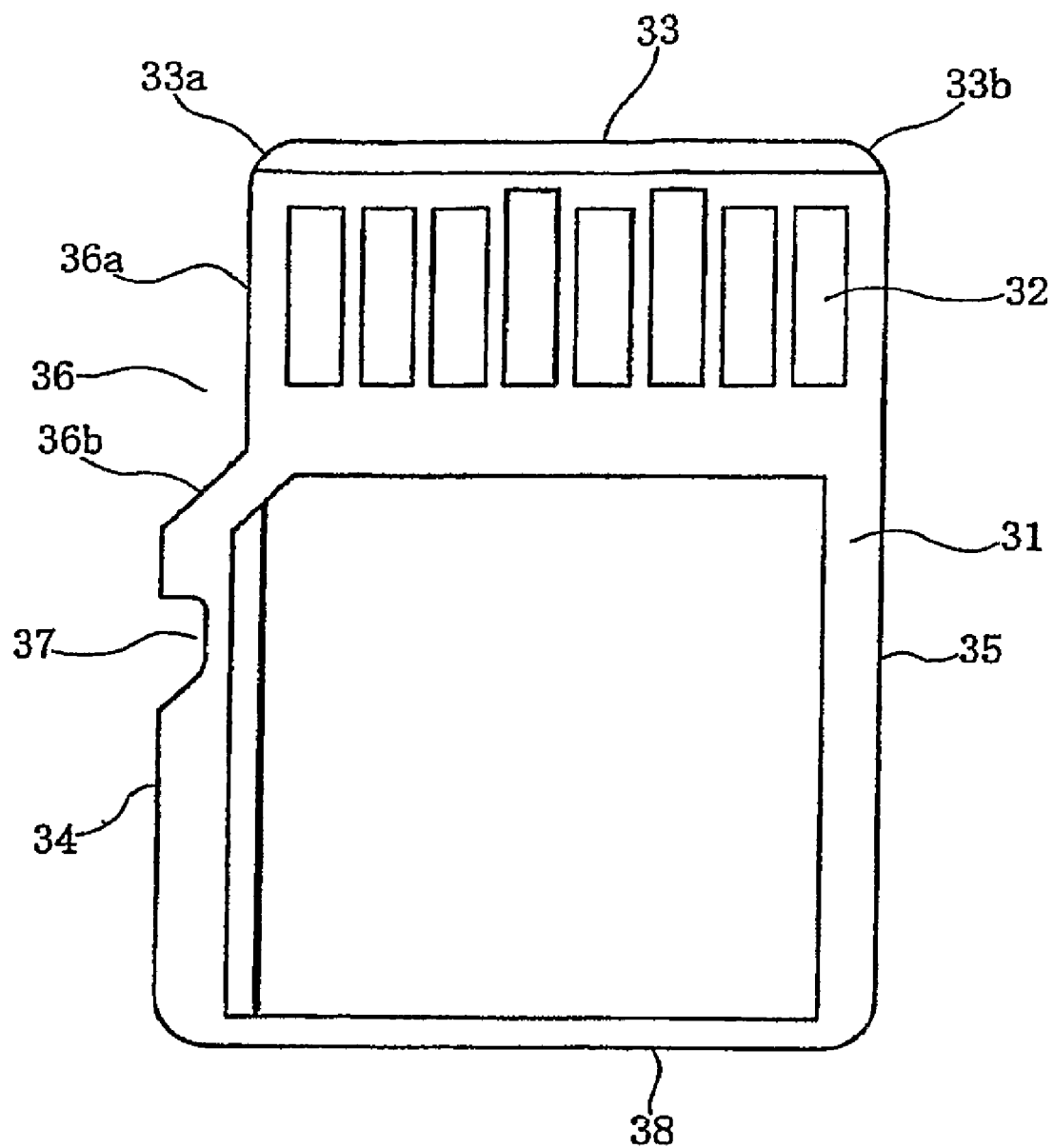
FIG. 3 is a plan view showing an electrode side surface of a card in the first embodiment.
Figure 4:
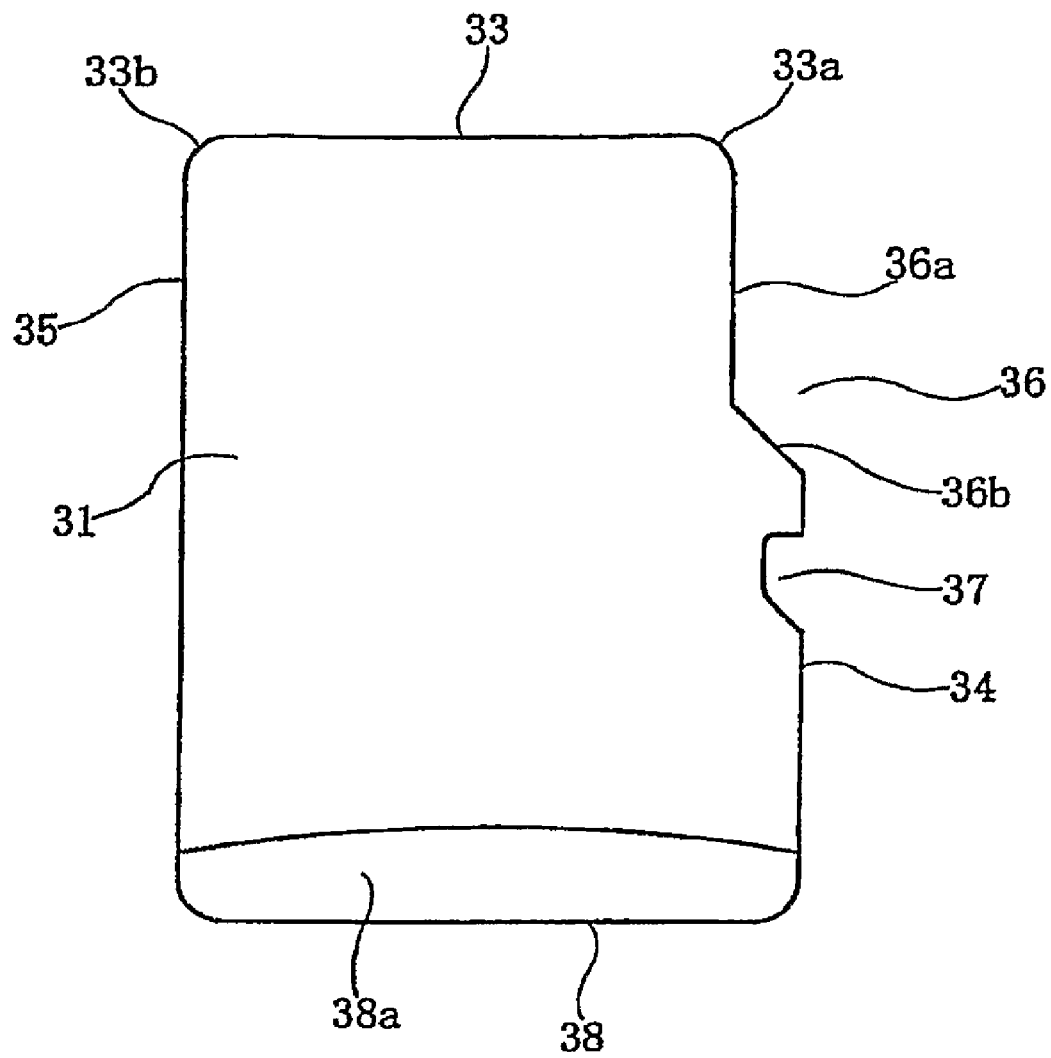
FIG. 4 is a plan view showing the reverse electrode side surface of the card in the first embodiment.

The card 31 is in the shape of a substantially rectangular plate. In an area near a front end 33 on one surface of the card 31, a plurality of contact pads 32 capable of operating as terminal members are disposed and exposed, as shown in FIG. 3. The other surface of the card 31 has, disposed thereon, no contact pads 32, as shown in FIG. 4. The card 31 has a first cut-away portion 36 formed at an area near the front end 33 on a first side 34, and a second cut-away portion 37 formed at an area nearer a rear end 38 than the first cut-away potion 36 on the first side 34. A second side 35 opposed to and parallel with the first side 34 has no cut-away portion, and extends linearly in a direction of insertion of the card 31. As shown in FIG. 3, the first side 34 corresponds to the left longer side when viewed from the contact pads 32 on the rectangular surface, and the second side 35 corresponds to the right longer side when viewed from the contact pads 32.

The first cut-away portion 36 has a linear part 36a extending from the front end 33 to the rear end 38, and a tapered shoulder part 36b connected to the rear end 38 side of the linear part 36a. The linear part 36a is parallel with the second side 35. The width of the linear part 36a of the card 31 (the lateral dimension when viewed in FIGS. 3 and 4) is narrower than that of the rest. A region where the front end 33 and the linear part 36a of the card 31 are connected to each other, namely a first front end corner part 33a as a first corner part on the first side 34, and a region where the front end 33 and the second side 35 of the card 31 are connected to each other, namely a second front end corner part 33b as a second corner part on the second side 35 in the front end 33, have an outer rounded face in the shape of a circular arc having a predetermined radius. A thick part 38a, which is larger than the rest in thickness (the dimension in a perpendicular direction in FIGS. 3 and 4), is formed at an area near the rear end 38 of the card 31.

In the present preferred embodiment, the card 31 may be any kind of card, for example, an IC card such as a mini SD® card, a TransFlash® card, a micro SD® card, or the like, which has the tapered shoulder part 36b formed near the front end 33 on the first side 34. Here, description will be made on the assumption that the card 31 is a micro SD® card.

In the preferred embodiment, it should be understood that the expressions of the respective directions, such as up, down, left, right, front, and rear, which are used to explain the constructions and operations of the parts of the card connector 10, are relative rather than absolute. That is to say, these expressions are appropriate when the card connector 10 and its parts take up the position as shown in the drawing figures. However, when the positions of the card connector 10 and its parts are changed, these descriptions shall be changed and interpreted according to a change in position of the card connector 10 and its parts.

Figure 1:
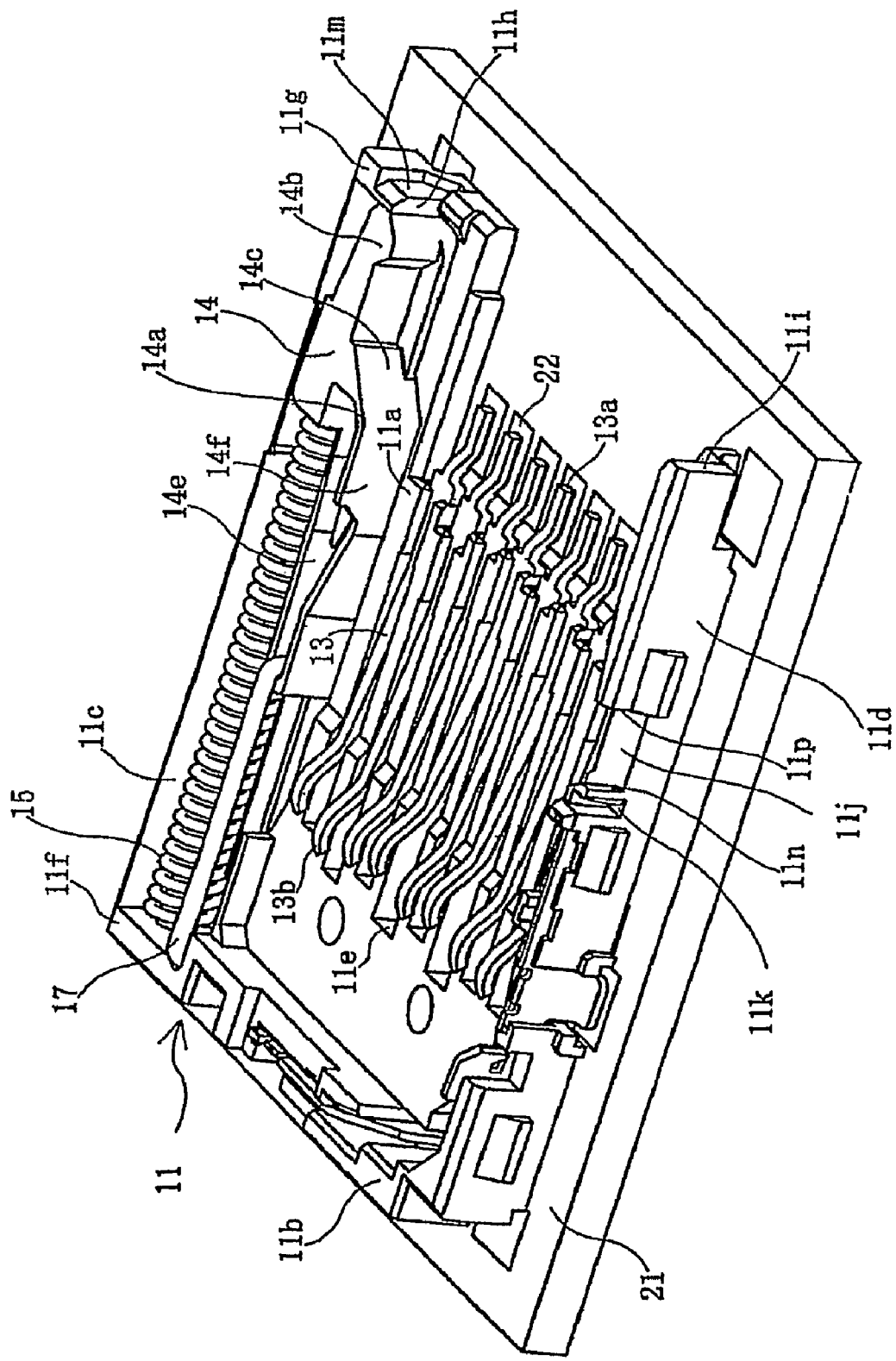
FIG. 1 is a perspective view showing a card connector in a state where a shell is removed or omitted therefrom for clarity in a first embodiment of the present invention.
Figure 2:
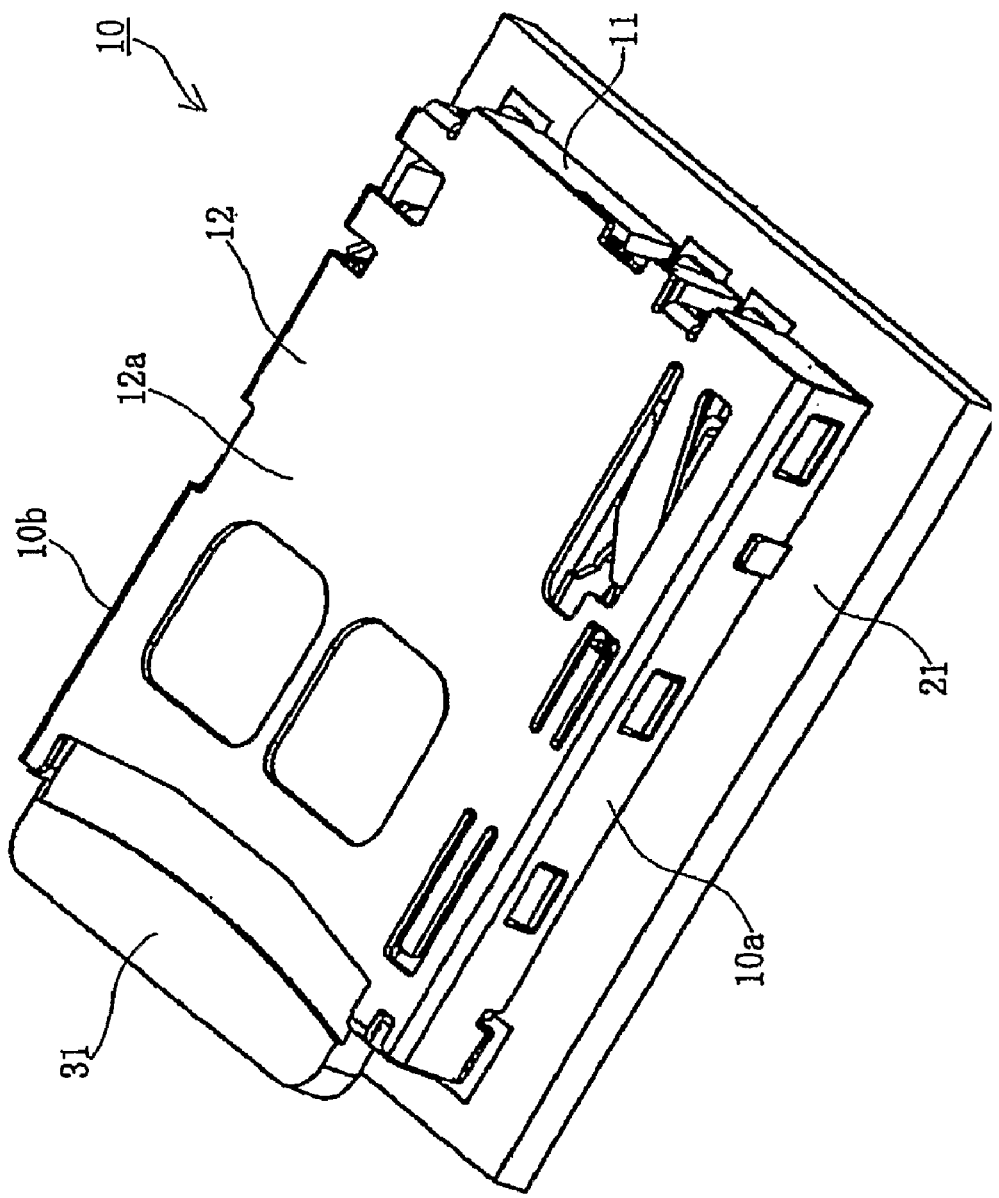
FIG. 2 is a perspective view showing the card connector in the first embodiment.

Referring now to FIG. 2, the card connector 10 has a housing 11 for holding the card 31, which is integrally molded by an insulating material such as synthetic resin, and a shell 12 as a case, which is secured to the upper side of the housing 11, and can be formed by applying a machining operation including punching, bending, and the like, to a plate member formed of a conductive material such as metal. A top surface 12a provided as a flat part of the shell 12 is formed in the shape of a flat plate, which covers a part of the card 31 inserted in the card connector 10, and covers a slide member 14 throughout a range in which the slide member 14 carries out its operation. The card connector 10 is in the shape of a substantially flat rectangular body, and is mounted on a surface of the substrate 21. The card 31 is inserted from the front of the card connector 10 (downward toward the right in FIG. 1, and upward toward the left in FIG. 2). At this stage, the following description will be made on such an assumption that the card 31 with its surface provided with the contact pads 32 facing down is inserted into the card connector 10. Specifically, when the card 31 is inserted, the first side 34 and the second side 35 of the card 31 travel along with a first side edge 10a and a second side edge 10b of the card connector 10, respectively.

FIG. 1 also shows the card connector 10 in a state where the shell 12 is removed or omitted therefrom for the convenience's sake of description. As shown in FIG. 1, the housing 11 has a bottom wall part 11a having such a shape that the front edge side (on the right and downward side as viewed in FIG. 1), which is the front with respect to the insertion direction of the card 31, is cut away in substantially U-letter shape, and a rear wall part 11b that extends along the rear edge at the rear of the bottom wall part 11a and stands vertical from the bottom wall part 11a. The upper surface of the bottom wall part 11a is provided with a plurality of terminal loading slots 11e formed so as to penetrate in back-and-forward direction. Terminals 13 capable of operating as connecting terminals are inserted into and secured to the terminal loading slots 11e, respectively. The root part of each of the terminals 13 is secured to a part adjacent to the edge on the front side of the bottom wall part 11a within the terminal loading slots 11e, and a tip 13b thereof extends upward in a slanted manner toward the rear wall part 11b and projects from the upper surface of the bottom wall part 11a. The tips 13b of the terminals 13 function as a contacting part, and are brought into contact with the contact pads 32 to be electrically connected thereto. Solder tale parts 13a extending from the root parts of the respective terminals 13 project frontward from the edge of the front side of the bottom wall part 11a, and are electrically connected by means of soldering or the like, to signal lines, contact pads, and terminals, etc., which are disposed so as to be exposed to the surface of the substrate 21, namely connected to a counterpart terminal part 22.

The housing 11 has a first sidewall part 11c as a side part having an "L" shaped cross section, which extend in the back-and-forward direction along one side edge of the bottom wall part 11a, and a second sidewall part 11d as a side part extending in the back-and-forward direction along the other side edge of the bottom wall part 11a. The first sidewall part 11c and the second sidewall part 11d correspond to the first side edge 10a and the second side edge 10b of the card connector 10, respectively.

The card connector 10 is of so-called push in/push out type or push-push type that requires the action of pushing the card 31 when inserting the card into the card connector 10, and when discharging the card 31 from the card connector 10. Therefore, the slide member 14 of the card guide mechanism for guiding the card 31 is attached to the first sidewall part 11c so that it can slide in the back-and-forward direction, namely the insertion direction of the card 31.

The slide member 14 has a first engaging part 14a and a second engaging part 14b, as engaging parts to be engaged with the card 31. The first engaging part 14a includes a tapered surface 14c as a tilted surface, which is the part engaged with the first cut-away portion 36 of the card 31, and against which the shoulder part 36b of the first cut-away portion 36 abuts. That is, the first engaging part 14*a* is a projecting part that projects from the first sidewall part 11*c* to the second sidewall part 11*d*. The tapered surface 14*c* is formed at the front side in the direction of insertion of the card 31 at the first engaging part 14*a*. A flat surface 14*f* opposing to a linear part 36*a* is formed on the far side of the tapered surface 14*c*. The flat surface 14*f* extends in the direction of insertion of the card 31. The second engaging part 14*b* is the part engaged with the second cut-away portion 37 of the card 31, and is formed integrally on the nearer side than the first engaging part 14*a* in the direction of insertion of the card 31, so as to project from the side surface on the inside of the slide member 14. This enables the slide member 14 to hold the card 31 by the first and second engaging parts 14*a* and 14*b*, and to travel together with the card 31 in the back-and-forward direction.

An urging member 15 formed of a coil spring, which is provided as a member for urging the slide member 14 forwardly, is secured to the first sidewall part 11*c*. Both ends of the urging member 15 are kept in contact with a backstop 11*f* of the rear wall part 11*b* and the rear end of the slide member 14, respectively. Thus, the urging member 15 can urge the slide member 14 in the direction reverse to the insertion direction of the card 31, namely in the direction for discharge the card 31.

One end of a pin member 17 as a stationary cam is engaged to the backstop 11*f*, and the other end of the pin member 17 is engaged in and pivotally connected to a cam groove 14*e* as a slide cam formed in the upper surface of the slide member 14. The pin member 17 cooperates with the cam groove 14*e* to cause the slide member 14 shifting together with the card 31 to perform the push-push action. Hence, the above-mentioned card guide mechanism can operate in such a manner that when the card 31 is moved in the insertion direction by the pushing action applied to the card 31 in the insertion direction until it reaches the terminus, the card 31 is caused by the urging force of the urging member 15 to shift from the terminus in the direction opposite to the insertion direction so as to be discharged from the card connector. Since the cam mechanism for performing the push-push action as in the case with the pin member 17 and the cam groove 14*e* is well known in the art, its further description is omitted here.

The first sidewall part 11*c* is formed at the front end part thereof with a stopper part 11*g* capable of operating as a stopper member to stop the slide member 14, which can shift so as to discharge the card 31. A corner part on the inside of the front end of the stopper part 11*g* is a second side abutting part 11*h* which is operative as a holding part, to which the second side 35 of the card 31 can be engaged, when the card 31 is improperly inserted as will be described later. A recess part provided on the front end side of the second side abutting part 11*h* forms a second side abutment supporting part 11*m* which is operative as a recessed portion with which a part of the shell 12 is engaged and thus, when the card 31 is inserted improperly, the second side abutment supporting part 11*m* allows the second side abutting part 11*h* to be supported by the shell 12 against a force exerted by the card 31.

A front end engaging recess part 11*j* provided as an engaging recess part is formed in the second sidewall part 11*d*, which allows for, when the card 31 is inserted improperly, approach of a corner part of the first side 34 at the front end 33 of the card 31, namely a first front end corner part 33*a*. In the example shown in the drawing, the front end engaging recess part 11*j* is formed as an opening that penetrates through the second sidewall part 11*d* in its thickness direction. Alternatively, it may be a recess part having such a shape that the side surface on the inside of the second sidewall part 11*d* is recessed outwardly. In this case, the depth of the recess part can be arbitrarily set. However, preferably, the depth of the recess part is larger than the radius of the outside face of the first front end corner part 33*a*. It is also preferable that the length of the front end engaging recess part 11*j*, namely the dimension from a front end wall 11*p* of the front end engaging recess part 11*j* to a rear end wall 11*n* as a receiving part is not less than two times the radius of the outside face of the front end corner part 33*a*. By so doing, if the card 31 is improperly inserted, the first front end corner part 33*a* of the card 31 can surely enter into the front end engaging recess part 11*j*.

Further, with respect to the insertion direction of the card 31, another recess part is formed on a further inner side than the rear end wall 11*n* of the front end engaging recess part 11*j*. This recess part forms a front end abutment supporting part 11*k* provided as a recessed portion, with which part of the shell 12 is engaged. Thus, when the card 31 is improperly inserted, this recess part allows the rear end wall 11*n* of the front end engaging recess part 11*j* to be supported by the shell 12 against the force exerted by the card 31.

A corner part of the inside of the front end of the second sidewall part 11*d* forms a shoulder abutting part 11*i*, against which the shoulder part 36*b* of the card 31 is allowed to come into abutment, when the card 31 is improperly inserted. At this stage, although not shown in the drawing figure, the second side abutment supporting part 11*m*, a shoulder abutment supporting part with which part of the shell 12 would be engaged, may be formed as desired. Thus, if the card 31 is improperly inserted, this supporting part will allow the shoulder abutting part 11*i* to be supported by the shell 12 against the force exerted by the card 31.

Here, the position where the front end engaging recess part 11*j* is disposed may be set arbitrarily. Nevertheless, the position of disposition should preferably be such that the length from the front end of engaging recess part 11*j* to the shoulder abutting part 11*i*, (more accurately, viewing in the insertion direction of the card 31, the length between the end of the front side of the front end engaging recess part 11*j* and the shoulder abutting part 11*i*) is longer than the length of the linear part 36*a* of the card 31. By so doing, if the card 31 is improperly inserted, the first front end corner part 33*a* of the card 31 can enter into the front end engaging recess part 11*j*, while maintaining a state where the shoulder part 36*b* of the card 31 is in abutment against the shoulder abutting part 11*i*.

It is also preferred that the second side abutting part 11*h* and the shoulder abutting part 11*i* are arranged at a substantially identical position in the direction of insertion of the card 31. Preferably, the first engaging part 14*a* and the tapered surface 14*c* of the slide member 14 are positioned so that the length from the second side abutting part 11*h* to the tapered surface 14*c* is shorter than the length of the linear part 36*a* of the card 31, in a state where the slide member 14 abuts against the stopper part 11*g*. Thus, if the card is improperly inserted, the second front end corner part 33*b* of the card 31 can be moved along the tapered surface 14*c*, so that the card 31 as a whole may be shifted in the direction of the second sidewall part 11*d*.

More preferably, the first engaging part 14*a* and the tapered surface 14*c* are disposed at positions where the length from the second side abutting part 11*h* to the top of the first engaging part 14*a*, i.e., to the end part on the rear wall part 11*b* of the tapered surface 14*c*, is shorter than the length of the linear part 36*a* of the card 31, in a state where the slide member 14 is in abutment against the stopper part 11*g*. Hence, if the card 31 is improperly inserted, the movement of the whole card 31 toward the second sidewall part 11d can be completed before the shoulder part 36b of the card 31 abuts against the shoulder abutting part 11i.

It is also preferable to set the distance between the flat surface 14f of the slide member 14 and the inner side surface of the second sidewall part 11d is slightly larger than the width of the linear part 36a of the card 31, and narrower than the distance between the first side 34 and the second side 35 of the card 31. Thus, if the card 31 is properly inserted, the engagement of the first engaging part 14a of the slide member 14 with the first cut-away portion 36 of the card 31 brings about a state where the linear part 36a of the card 31 comes in contact with or in proximity with the flat surface 14f of the slide member 14, and further the second side 35 of the card 31 comes in contact with or in proximity with the internal side surface of the second sidewall part 11d. Hence, the card 31 can smoothly travel together with the slide member 14, along the second sidewall part 11d.

The operation of the above-constructed card connector 10 will be described hereinbelow. First, a description will be provided of a case where the card 31 is inserted in its proper attitude into the card connector 10, namely in a case of proper insertion of the card 10.

In this case, a user inserts manually (by the hand and finger) the card 31 from the front side of the card connector 10. The card 31 is inserted in such a position that the front end 33 thereof is directed toward the rear wall part 11b of the housing 11, and the surface provided with the contact pads 32 is opposed to the substrate 21, and the surface provided with no contact pads 32 is opposed to the top surface 12a of the shell 12. Thus, the first side 34 of the card 31 travels along the first sidewall part 11c of the housing 11, and the second side 35 thereof travels along the second sidewall part 11d of the housing 11.

Subsequently, when the user further pushes the card 31 toward inside of the card connector 10, the first and second engaging parts 14a and 14b of the slide member 14 come into engagement with the first and second cut-away portions 36 and 37 of the card 31, respectively, so that the card 31 travels together with the slide member 14 toward the rear wall part 11b. At this time, the pressing force exerted by the user's hand and finger is transmitted from the shoulder part 36b of the card 31 through the tapered surface 14c of the first engaging part 14a to the slide member 14. Then, the slide member 14 compresses the urging member 15 comprised of a coil spring, so that the slide member 14 and the card 31 are subjected to a repulsive force of the urging member 15. However, they can travel against the repulsive force because the repulsive force is smaller than the push force developed by the user's hand and finger, or the like. In this case, the slide member 14 slides along the first sidewall part 11c, and the card 31 travels together with the slide member 14. Specifically, the first side 34 and the second side 35 of the card 31 travel along with the first sidewall part 11c and the second sidewall part 11d of the housing 11, respectively. Thereafter, the slide member 14 and the card 31 reach the terminus that is fully advanced position, and enter the full-stroke state.

When the user then stops the action of pushing the card 31 to release the push force against the card 31, the repulsive force of the urging member 15 causes the slide member 14 and the card 31 to travel in the direction away from the rear wall part 11b. The slide member 14 and the card 31 are then stopped at a lock position where the card 31 is held in the lock state in the card connector 10. This is because the pin member 17 being engaged in the cam groove 14e of the slide member 14 comes into engagement with a part of the cam groove 14e, thereby stopping the motion of the slide member 14, thus stopping the slide member 14 at the lock position.

The card 31 is then held at the lock position, so that it is brought into a state where data sending to and receiving from an operation means and the like of the electronic equipment provided with the substrate 21 mounting thereon the card connector 10 is permitted. It should be noted that when the card 31 is held at the lock position, the contact pad 32 of the card 31 is in contact with the tips 13b of the terminals 13 to maintain the electrical conduction.

The following is the operation for discharging and removing the card 31 from the card connector 10.

When the user pushes the card 31 by the hand and finger, or the like, the slide member 14 and the card 31 are removed from the lock position to the rear wall part 11b. Further push of the card 31 causes the slide member 14 and the card 31 to reach the terminus that is fully advanced position, and enter the full-stroke state.

Subsequently, when the user stops the action of pushing the card 31 to release the push force against the card 31, the repulsive force of the urging member 15 causes the slide member 14 and the card 31 to travel in the direction away from the rear wall part 11b and to return to the direction of the lock position. In this case, even if the slide member 14 reaches the lock position, the pin member 17 being engaged in the cam groove 14e of the slide member 14 is not in engagement with a part of the cam groove 14e, and hence the action of the slide member 14 cannot be limited, failing to stop at the lock position. Consequently, the slide member 14 and the card 31 pass through the lock position and travel further in the opposite direction of the insertion direction of the card 31.

Upon the abutment of the front end of the slide member 14 against the stopper part 11g, the slide member 14 and the card 31 come to a stop. At this time, the engagements between the first and second cut-away portions 36 and 37 of the card 31 and the first and second engaging parts 14a and 14b of the slide member 14 remain unreleased. In other words, even if the slide member 14 returns to the position as shown in FIG. 1, the card 31 will not jump out of the card connector 10 because it is placed in the temporal hold state by the first and second engaging parts 14a and 14b of the slide member 14. This eliminates the possibility of loss of the card 31.

The strength that the first and second engaging parts 14a and 14b of the slide member 14 temporarily hold the card 31 is more than sufficient not to release the card 31 when the slide member 14 is brought to a stop by the abutment thereof against the stopper part 11g. That is however sufficiently weaker than the strength that the user pulls the card 31 by the hand and finger, or the like. Therefore, the card 31, which is temporarily held by the first and second engaging parts 14a and 14b of the slide member 14 that are stopped under the abutment against the stopper part 11g, can be easily removed from the slide member 14 by pulling it with the user's hand and finger, or the like.

Referring to FIGS. 5-10, the following is the operation when the card 31 is inserted improperly. For the convenience's sake of description, only the case where the card 31 is inserted upside down will be discussed hereinafter.

Figure 5:
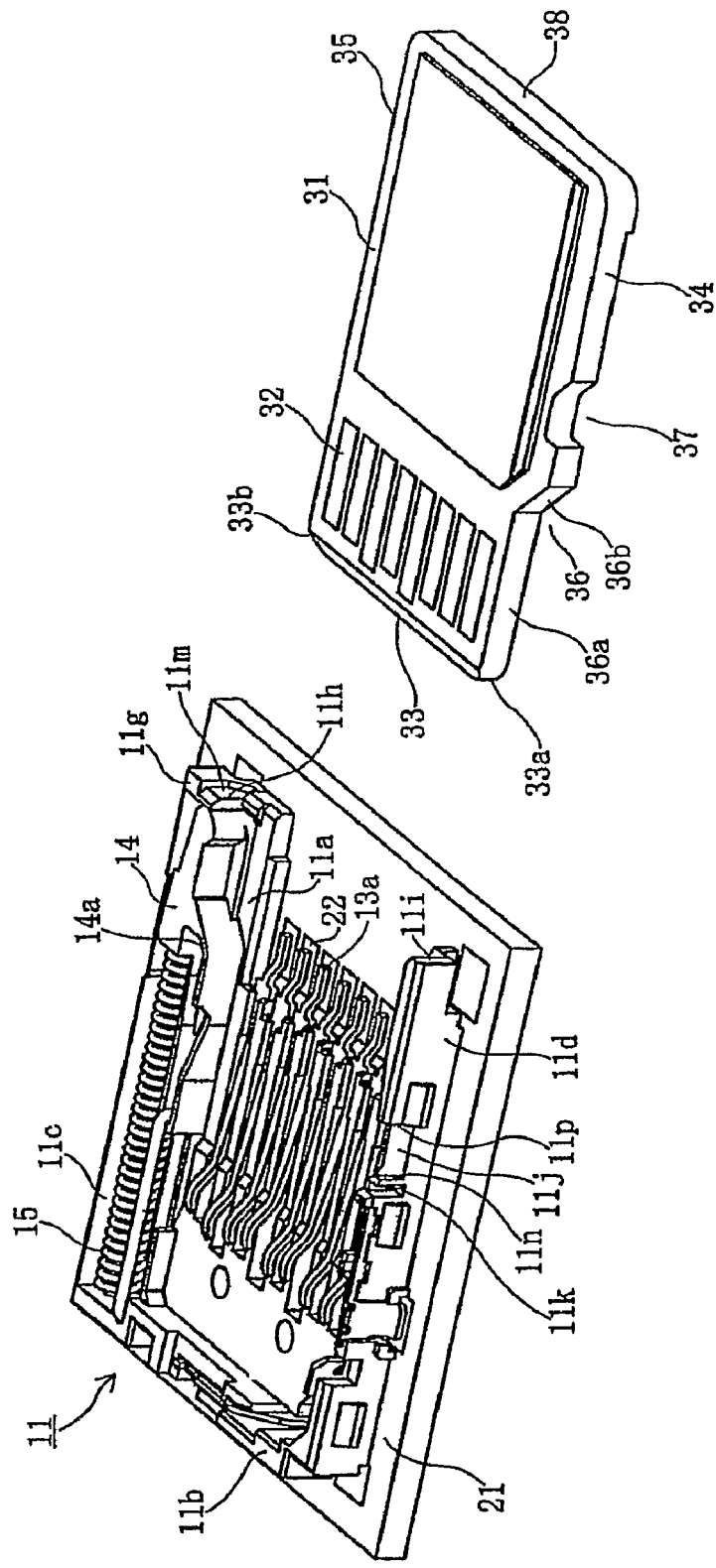
FIG. 5 is a perspective view of a state where the shell is removed or omitted from the card connector, showing a card improperly oriented prior to insertion into the card connector of the first preferred embodiment.

An improper insertion can occur, if the user inserts the card 31 from the front of the card connector 10 without paying appropriate attention to the attitude or position of the card 31. In the example as shown in FIG. 5, the card 31 is inserted upside down, namely in such an attitude that the surface provided with the contact pad 32 is opposed to the top surface 12a of the shell 12, and the surface without the contact pad 32 is opposed to the substrate 21. In FIG. 5, the shell 12 is removed or omitted from the card connector 10, for the convenience's sake of description.

When the front end 33 of the card 31 is inserted into the card connector 10, the second front end corner part 33b as the corner part on the second side 35 at the front end 33 is brought into contact with the tapered surface 14c of the slide member 14. The tapered surface 14c is formed on the front side in the insertion direction of the card 31 at the first engaging part 14a projecting from the side surface on the inside of the slide member 14. Therefore, if the card 31 travels in this state, the second front end corner part 33b is guided by the tapered surface 14c, so that the card 31 is fully moved toward the second sidewall part 11d. That is, the card 31 shifts in its width direction so as to approach the second sidewall part 11d.

Here, the width of the card 31 is narrower than the rest at the linear part 36a, and the linear part 36a is part of the first cut-away portion 36 to be engaged with the first engaging part 14a. Accordingly, the difference between the width of the card 31 at the linear part 36a and the width of the card 31 at the rest is approximately equal to the amount of projection of the first engaging part 14a. This enables the card 31 to move toward the second sidewall part 11d by the amount of projection of the first engaging part 14a. That is, the improperly inserted card 31 travels in its insertion direction, in spaced relation to the first engaging part 14a of the slide member 14.

Figure 6:
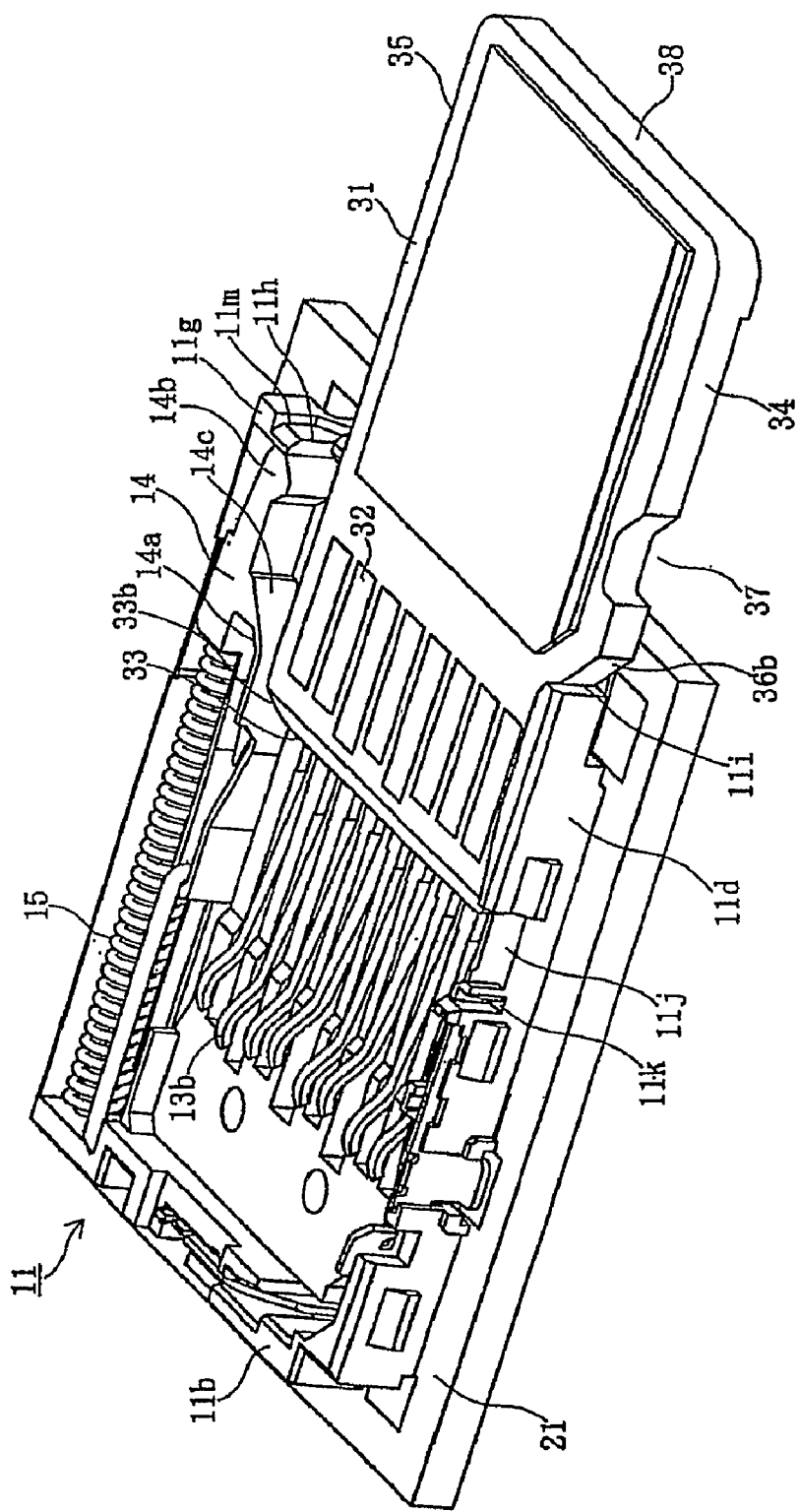
FIG. 6 is a perspective view of a state where the shell is removed or omitted from the card connector, showing the card being improperly inserted into the card connector of the first embodiment.

In a case where the length from the second side abutting part 11h to the end of the rear wall part 11b of the tapered surface 14c is shorter than the length of the linear part 36a of the card 31, as shown in FIG. 6, the full-shift of the card 31 toward the second sidewall part 11d is completed before the shoulder part 36b abuts against the shoulder abutting part 11i. As a result, the linear part 36a is in contact with or close to the internal side surface of the second sidewall part 11d. Here, the second side 35 of the card 31 is far away from the second side abutting part 11h.

Subsequently, if the user further pushes the card 31 by applying the force in the insertion direction to the rear end 38 of the card 31, the card 31 is rotated in a direction in which the rear end 38 travels to the first sidewall part 11c of the housing 11, namely in a counterclockwise direction when viewed from above in FIG. 6, because the second front end corner part 33b of the card 31 abuts against the slide member 14, and the tapered shoulder part 36b abuts against the shoulder abutting part 11i, and the second side 35 is far away from the second side abutting part 11h. Then, as shown in FIG. 10, at the time the first front end corner part 33a of the card 31 enters into the front end engaging recess part 11j, and abuts against the rear end wall 11n, the insertion of the first front end corner part 33a is stopped, and the advance of the card 31 is limited, resulting in the state as shown in FIGS. 7 through 10.

Figure 8:
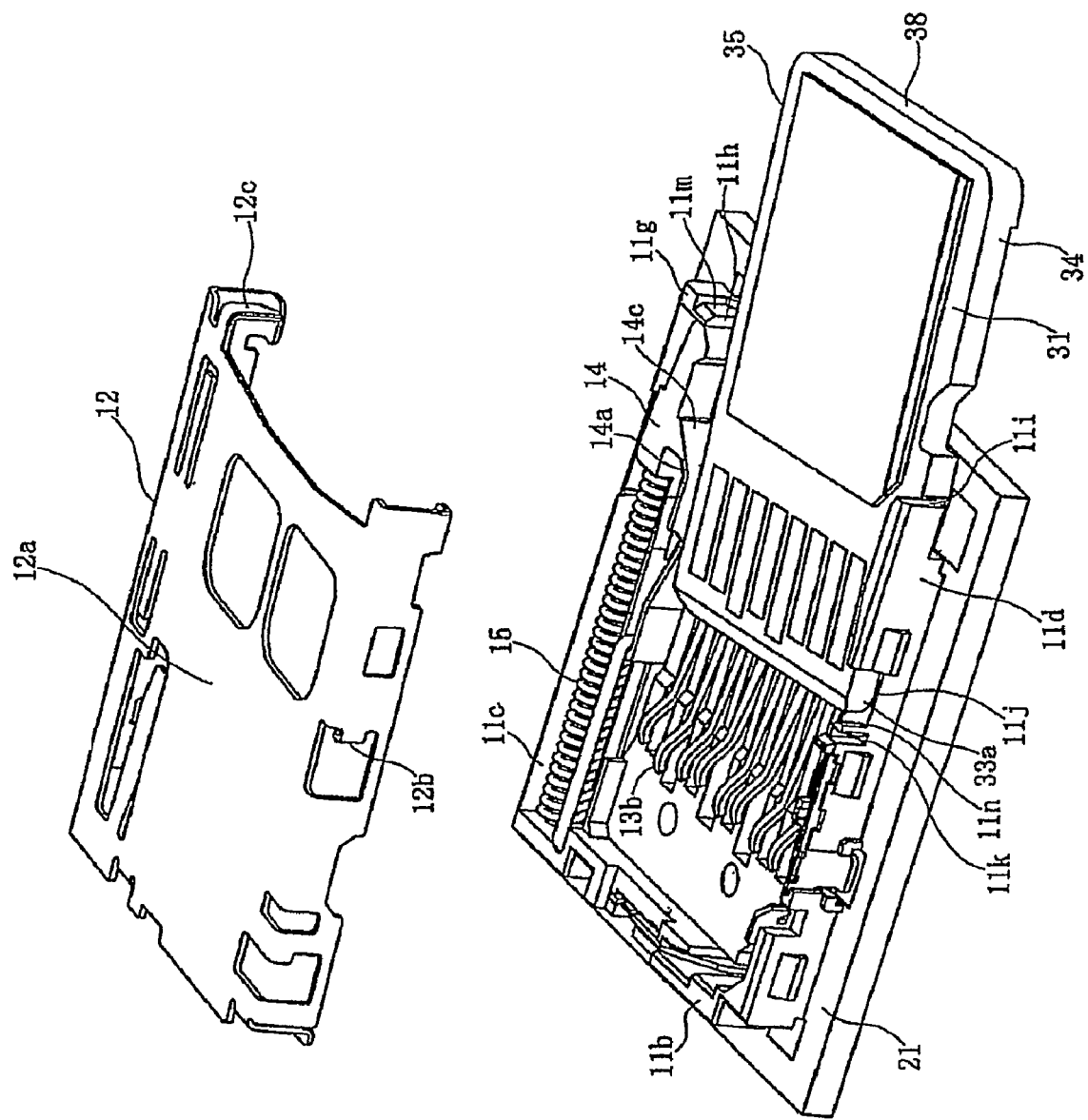
FIG. 8 is a perspective view similar to FIG. 7 showing the shell removed therefrom.
Figure 9:
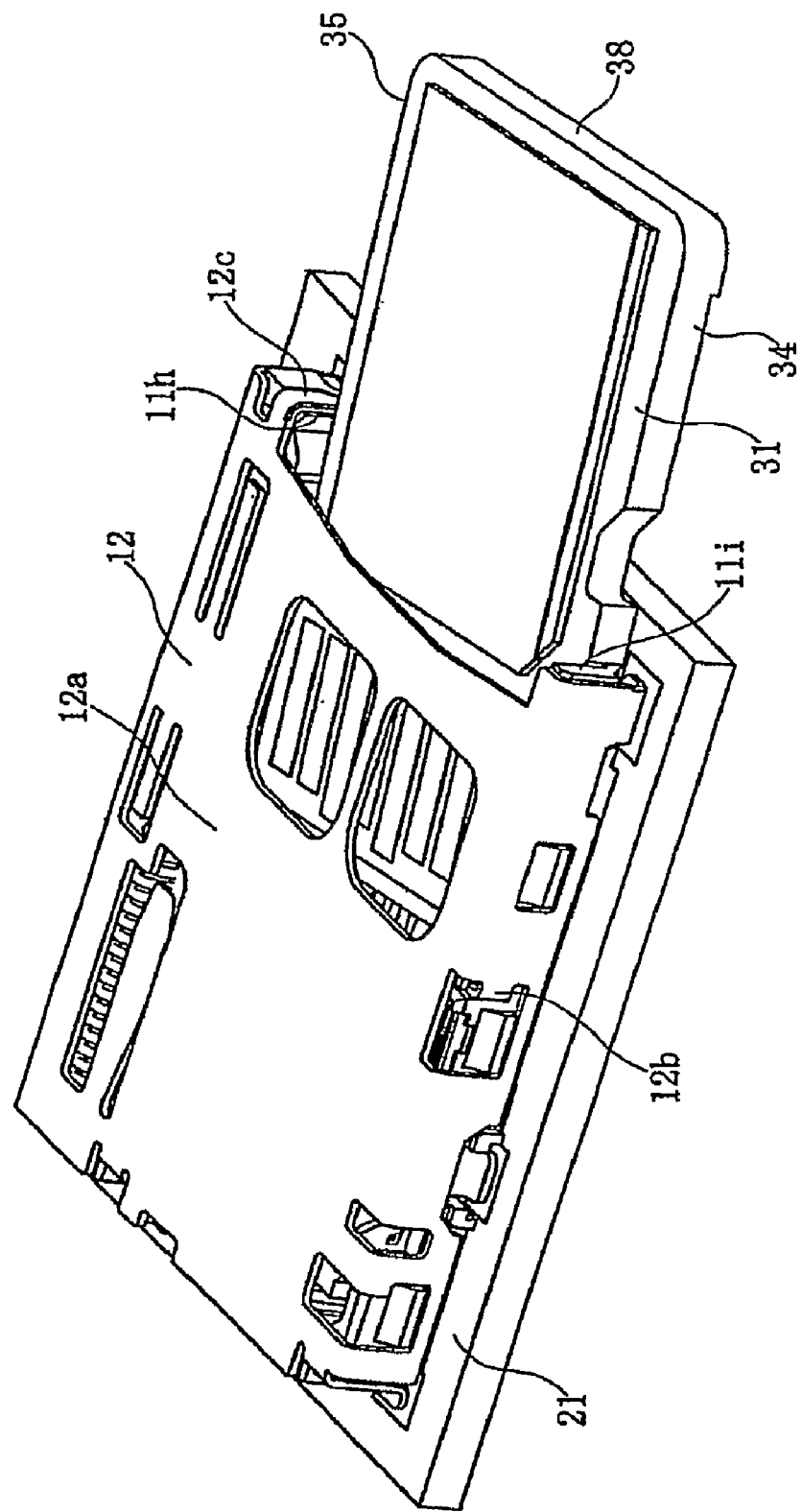
FIG. 9 is a perspective view similar to FIG. 8 in which the shell is mounted on the connector of the first embodiment.

In the present embodiment, as shown in FIG. 8, the shell 12 has a first support part 12b that is formed so as to project inwardly from the sidewall corresponding to the second sidewall part 11d of the housing 11, and a second support part 12c formed so as to project downward from the position corresponding to the front end of the first sidewall part 11c of the housing 11. Referring to FIGS. 9 and 10, with the shell 12 mounted on the housing 11, the first support part 12b engages with the front end abutment supporting part 11k of the housing 11 to thereby support the rear end wall 11n of the front end engaging recess part 11j, and the second support part 12c engages with the second side abutment supporting part 11m of the housing 11 thereby to support the second side abutting part 11h.

Figure 7:
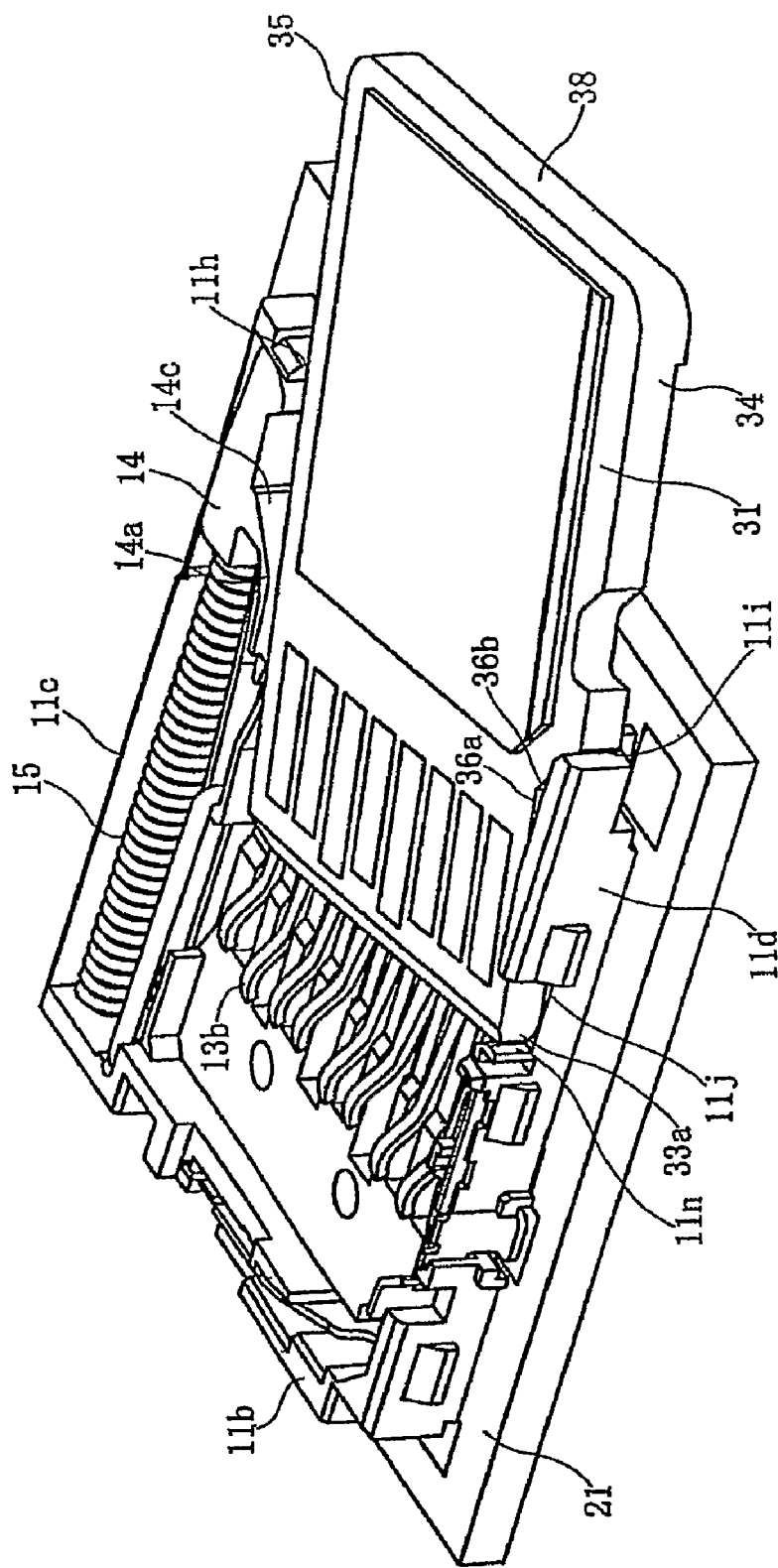
FIG. 7 is a perspective view of a state where the shell is removed or omitted from the card connector, showing the card tilting sideways due to improper insertion into the card connector of the first embodiment.
Figure 10:
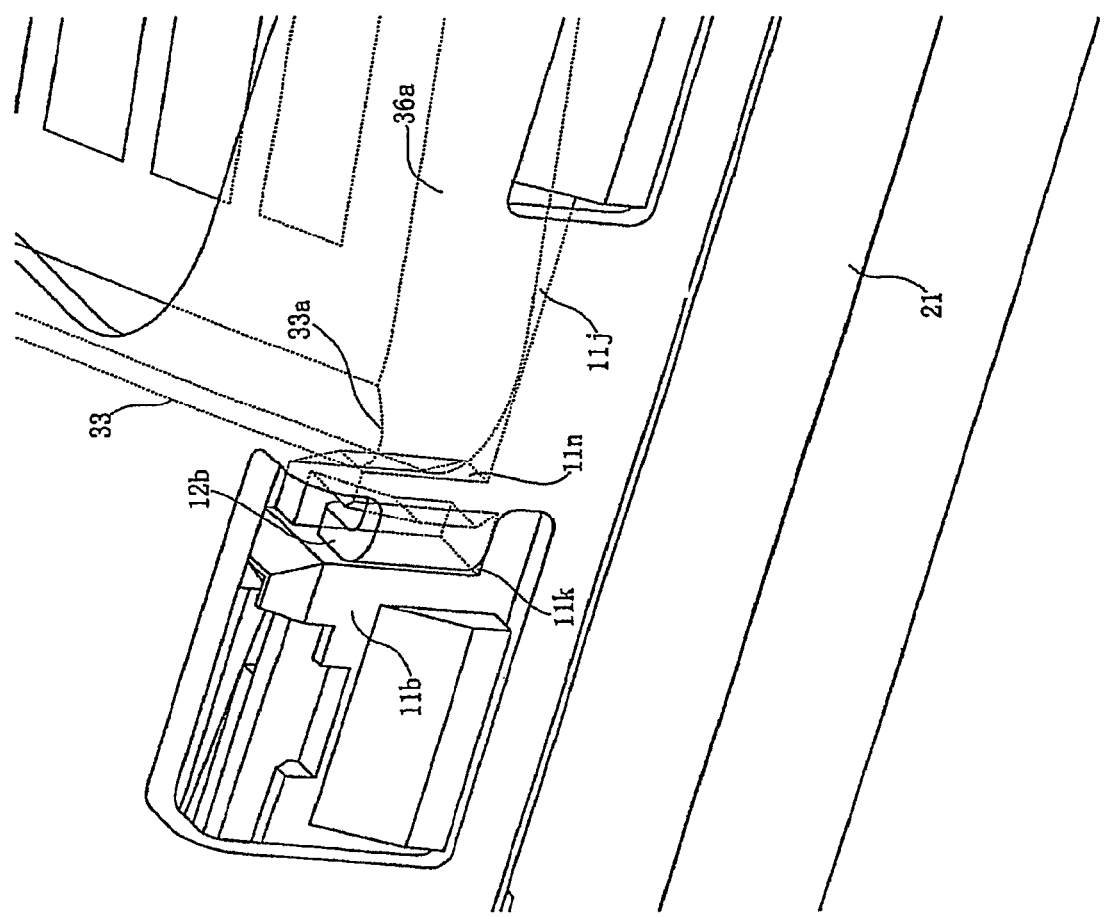
FIG. 10 is a perspective view in enlarged dimension of an important part in the state where the shell is secured to the card connector, showing the improper inserting operation in the first preferred embodiment.

As seen in FIGS. 7 to 10, the card 31 takes up a position tilted with respect to the insertion direction. As best shown in FIG. 7, the second side 35 of the card 31 is in contact with the second side abutting part 11h. At this time, as best seen in FIG. 10, the first front end corner part 33a is in contact with the rear end wall 11n of the front end engaging recess part 11j. Consequently, the improperly inserted card 31 is inhibited from further travel by the abutment of a plurality of positions thereof against a plurality of positions of the housing 11. That is, the further travel of the card 31 is inhibited by the abutment of the first front end corner part 33a against the rear end wall 11n of the front end engaging recess part 11j, and the abutment of the second side 35 against the second side abutting part 11h, and the abutment of the shoulder part 36b against the shoulder abutting part 11i. At this time, the front end engaging recess part 11j, the second side abutting part 11h, and the shoulder abutting part 11i of the housing 11 function as improper insertion preventing members to prevent any improper insertion of the card 31.

The card 31 is then stopped at the position as shown in FIGS. 7 to 10, by the abutment of the front end engaging recess part 11j against the first front end corner part 33a, and the abutment of the second side abutting part 11h against the second side 35, and the abutment of the shoulder abutting part 11i against the shoulder part 36b. As shown in FIGS. 7 and 8, the absence of abutment against the surface provided with the contact pad 32 of the card 31 eliminates the possibility of damage to the tips 13b of the terminals 13.

Further, the card 31 abuts against the housing 11 through the first front end corner part 33a, the second side 35, and the shoulder part 36b. Although the card 31 is subjected to a reaction force by which further travel of the card 31 is inhibited, the reaction force can be dispersed to a plurality of positions of contact with the card 31. This eliminates the possibility of damage to the card 31 if subjected to the reaction force from the housing 11. Furthermore, the front end engaging recess part 11j, the second side abutting part 11h, and the shoulder abutting part 11i, against which the card 31 abuts, are formed of an insulating material such as synthetic resin, unlike hard material such as metal. This also eliminates the possibility of damage to the card 31.

On the other hand, the housing 11 abuts against the card 31 through the front end engaging recess part 11j, the second side abutting part 11h, and the shoulder abutting part 11i. Although the housing 11 is subjected to the force by which the card 31 is inserted, this force can be dispersed to a plurality of positions of contact with the housing 11. This eliminates the possibility of damage to the housing 11 even if subjected to the force exerted by the card 31. Further, since the rear end wall 11n of the front end engaging recess part 11j is supported by the engagement of the first support part 12b of the shell 12 with the front end abutment supporting part 11k, there is less possibility of deformation and damage to the housing 11 even if subjected to the force exerted by the card 31. Similarly, since the second side abutting part 11h is supported by the engagement of the second support part 12c of the shell 12 with the second side abutment supporting part 11m of the card 31, there is less possibility of deformation and damage to the housing 11 even if subjected to the force exerted by the improper insertion of the card 31. In an alternative, the tip of the first supporting part 12b may be subjected to a machining operation including bending, in order that the card 31 is not brought into a direct contact with the corner part of the shell 12, the first supporting part 12b directly receives the front end 33 of the card 31, and the rear end wall 11n of the front end engaging recess part 11j supports the first supporting part 12b.

In the foregoing embodiment, the description has been made of the case where the card connector 10 has the card guide mechanism, the projecting part that projects from the first side wall part 11c to the second side wall part 11d is the first engaging part 14a of the slide member 14. Alternatively, the card connector 10 may not be provided with any card guide mechanism. In this case, the projecting part may be of any type one which includes the shoulder part 36a and the tapered surface 14c of the card 31, and projects from the first sidewall part 11c toward the second sidewall part 11d. For example, it may be a projecting elastic body fixed to the first sidewall part 11c.

As above described, in the present preferred embodiment, the card connector 10 has the housing 11, into which the card 31 is inserted. The housing 11 is provided with: the first and second side wall parts 11c and 11d that are opposed to the first and second sides 34 and 35 of the card 31 inserted in its proper attitude, respectively, and that extend in the insertion direction of the card 31; the projecting part which includes the tapered surface 14c that abuts against the shoulder part 36b of the card 31, and which projects from the first side wall part 11c to the second sidewall part 11d; and the front end engaging recess part 11j formed in the second side wall part 11d so as to permit insertion of the first front end corner part 33a of the card 31.

With this construction, if an improperly inserted card 31 travels along the tapered surface 14c, the shoulder part 36b of the card 31 abuts against the front side end of the second sidewall part 11d and is rotated, so that the first front end corner part 33a of the card 31 enters into the front end engaging recess part 11j. Thus, the abutments of the plurality of positions of the housing 11 against the plurality of positions of the card 31 can inhibit any further travel of the card 31. This eliminates the possibility of damage to the housing 11 by the force exerted by the card 31, and damage to the card 31. It is therefore possible to reliably prevent any improper insertion of the card 31 that is small. Thus, such a simple construction ensures the inhibition of the improperly insertion of the card 31. Further, there is no need to add any member for preventing an improper insertion, causing no increase in the number of parts and no increase in cost. Moreover, the card 31 is free of damage.

The card connector 10 is further provided with the card guide mechanism attained by the slide member 14, and the urging member 15 that is arranged to urge the slide member 14 in the reverse direction of the insertion direction of the card 31. That is, when the slide member 14 travels in the insertion direction and reaches the terminus by the push action that causes the slide member 14 to stop at the lock position and causes the card 31 to be pushed in the insertion direction, the urge force of the urging member 15 causes the slide member 14 to travel from the terminus in the opposite direction of the insertion direction to thereby discharge the card 31. The above-mentioned projecting part corresponds to the first engaging part 14a of the slide member 14. The push-push operation provides simple insertion and discharge of the card 31.

A second preferred embodiment of the present invention will now be described below. It should be appreciated that the same reference numerals have been retained for the same structure as in the first embodiment, and therefore the description thereof is omitted here. This is also true for the operation and the effect.

Figure 11:
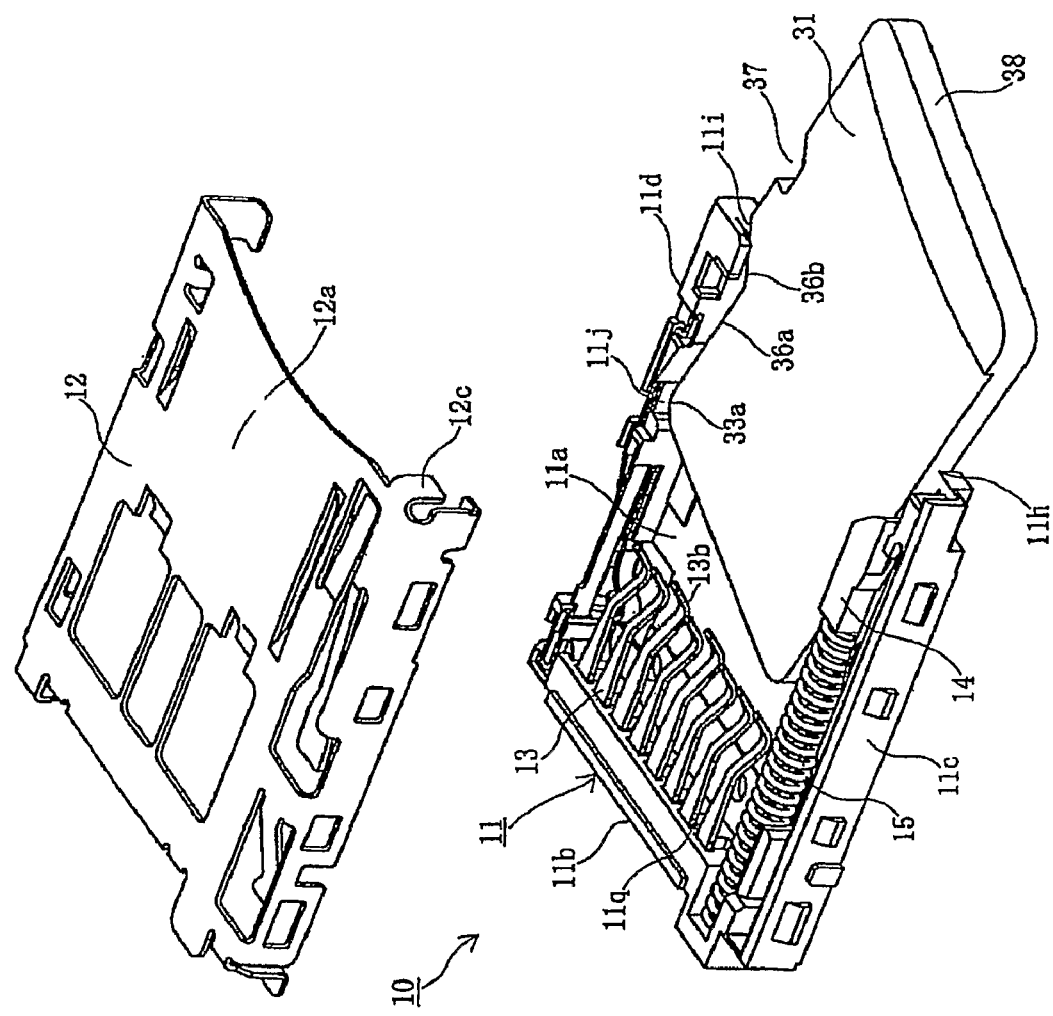
FIG. 11 is an exploded view showing an improper inserting operation in a second embodiment of the present invention.
Figure 12:
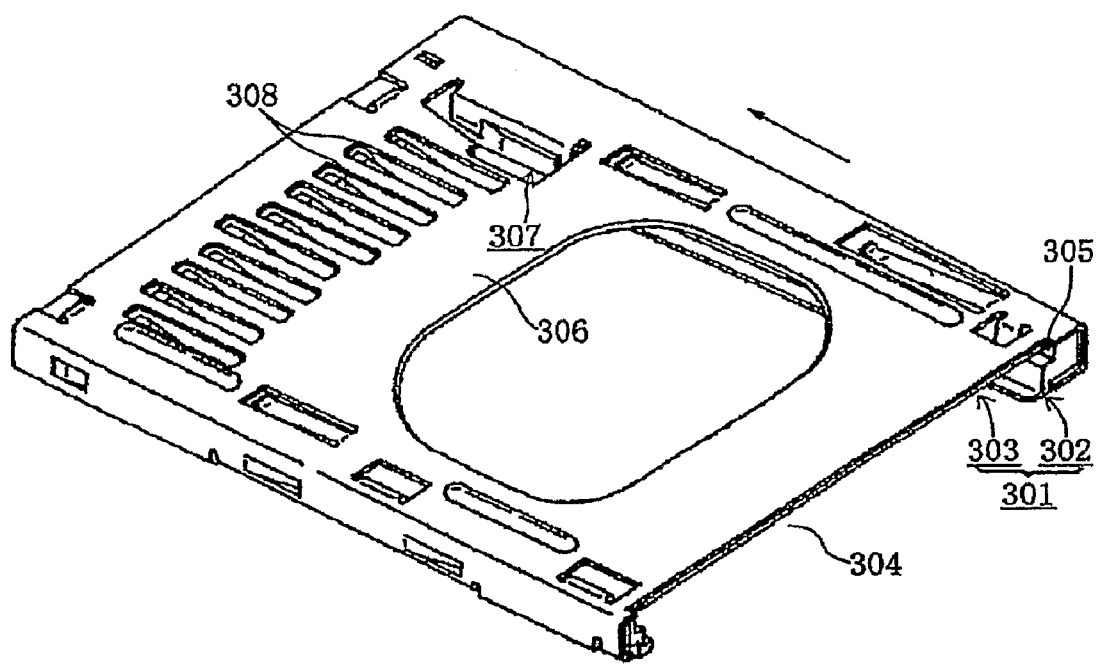
FIG. 12 is a schematic perspective view showing a prior art card connector.

FIG. 11 is an exploded view showing an improper inserting operation in a second embodiment of the present invention.

The card connector 10 of the first embodiment is adapted to the case of inserting the card 31 in such a state where the surface provided with the contact pad 32 is opposed to the substrate 21, and the surface without the contact pad 32 is opposed to the top surface 12a of the shell 12. On the other hand, the card connector 10 of the second embodiment is adapted to the case of inserting the card 31 in such a state where the surface provided with the contact pad 32 is opposed to the top surface 12a of the shell 12, and the surface without the contact pad 32 is opposed to the substrate 21. In the first embodiment, the card 31 is improperly inserted into the card connector, namely upside down. On the other hand, in the second embodiment, configured so that it is properly inserted when the contact pads 32 face up and the cut-away portion 36 faces to the left in FIG. 11.

Therefore, the positional relationship between the parts of the housing 11 and the parts of the shell 12 with regard to the insertion direction of the card 31 in the second embodiment is the reverse of that in terms of the right and left directions. Further, the rear wall part 11b is provided with a plurality of terminal loading slots 11q formed so as to penetrate in back-and-forth direction, and the root parts of terminals 13 are inserted into and secured to the terminal loading slots 11q, respectively. Each of the terminals 13 extends to the front edge side of the housing 11, and a tip 13b thereof projects downward, so that it is brought into contact with the contact pad 32 provided on an upward surface of the card 31 and is electrically connected thereto.

Otherwise, the construction of the second preferred embodiment is identical to that described with respect to the first embodiment, and therefore the description thereof is omitted here.

The operation when the card 31 is properly inserted is the same as that in the first embodiment, except that the attitude of the card 31 is upside down. The description of the operation is therefore omitted here.

The operation when the card 31 is improperly inserted is also the same as that in the first preferred embodiment, except that the attitude of the card 31 is upside down. That is, in a state where the rotation of the card 31 is stopped as shown in FIG. 11, the card 31 is tilted with respect to the insertion direction, so that the first front end corner part 33a of the card 31 enters into the front end engaging recess part 11j, and the second side 35 comes in abutment or impingement against the second side abutting part 11h, and the shoulder part 36b comes in abutment against the shoulder abutting part 11i, thereby inhibiting any advance of the card 31.

Otherwise, the operation of the second preferred embodiment is identical to that described with respect to the first embodiment, and therefore the description thereof is omitted here.

In a connector in which the terminals 13 extend toward the front edge side of the housing 11, as in the card connector 10 of the second embodiment, if the card 31 is improperly inserted and brought into contact with the terminals 13, the terminals 13 might cause buckling. Nevertheless, in the second embodiment, the front end engaging recess part 11j, the second side abutting part 11h, and the shoulder abutting part 11i of the housing 11 function as improper insertion preventing members to prevent any improper insertion of the card 31. This prevents the improperly inserted card 31 from coming in contact with the terminals 13, thus eliminating any possibility that the terminals 13 is subjected to buckling.

It is to be understood that the present invention should not be limited to the foregoing preferred embodiments thereof and thus, various changes and modifications will occur to a person skilled in the art based on the gist of the invention, and they should not be excluded from the scope and sprit of the invention as claimed in the appended claims.

What is claimed is:

1. A card connector for receiving a generally rectangular card therein, the card having contact pads and generally parallel first and second sides with a cut-away portion formed in the first side in proximity to a front end of said card, the cut-away portion including a short length extending from the front end generally parallel to said first side, and a tapered shoulder part extending from said short length to the first side, the card connector comprising:

an insulative housing having first and second spaced apart sidewalls defining a cavity therein for receiving the card in an insertion direction, a tapered surface adjacent said first sidewall to guide an improperly inserted card at an angle to said insertion direction and a second sidewall recess formed in said second sidewall to permit entrance of a corner part of such improperly inserted card; and a plurality of electrically conductive terminals mounted in said housing configured to engage the contact pads of the card upon proper insertion of the card into the housing.

2. The card connector according to claim 1, further comprising:

a card guide mechanism including a slide member configured to engage a card properly inserted into the housing, and an urging member configured to urge the slide member in a direction opposite to the insertion direction, the slide member including a projecting part that engages said cut-away portion of the card upon proper insertion of the card into the connector.

3. The card connector according to claim 2 wherein the card guide mechanism is configured such that when the slide member is stopped at a lock position, and the slide member is subsequently moved in the insertion direction until it reaches a termination point by pushing the card in the insertion direction, the slide member is shifted from the termination point to a direction opposite to the insertion direction by an urging force of the urging member, thereby discharging the card from the connector.

4. The card connector according to claim 1, wherein the first sidewall and the second sidewall include, at a front side end thereof in the insertion direction, a second side abutting part and a shoulder abutting part, respectively, against which the second side and the shoulder part of the inserted card are permitted to engage upon improper insertion of the card.

5. The card connector according to claim 4, wherein a length from the shoulder abutting part to the second sidewall recess is longer than a length of the short length of the card.

6. The card connector according to claim 1, wherein a depth of the second sidewall recess is larger than a radius of the corner part of said improperly inserted card.

7. The card connector according to claim 4, wherein a length from the second side abutting part to the tapered surface is shorter than a length of the short length.

8. The card connector according to claim 1, wherein the housing is provided with a shell recess formed at a position located further within said cavity along the insertion direction than the recess part, and the shell includes a first supporting part positioned within said shell recess.

9. The card connector according to claim 4, wherein the housing is provided with a recess part formed at the second side abutting part, and the shell is provided with a second supporting part capable of engaged with the recess part.

10. The card connector according to claim 1, further comprising a metal shell mounted on said housing.

11. A card connector comprising:

a housing for holding a card provided with a terminal member, the card being adapted for being inserted into the housing;

a connecting terminal configured to be secured to the housing and to be brought into contact with the terminal member of the card; and a case configured to be secured to the housing and provided with a flat part, wherein:

the card is provided with a first cut-away portion formed near a front end on a first side, and a second side opposing to the first side and extending linearly from a second corner part of the front end to a rear end;

a first side edge of the card connector is provided with an engaging part engaged with a first cut-away portion of a card inserted in a proper attitude thereof;

the engaging part includes a tilted surface configured to allow an improperly inserted card to shift to a second side edge of the card connector; and the second side edge is provided with a shoulder abutting part capable of abutting against a shoulder part of the first cut-away portion of the improperly inserted card thereby allowing the card to be tilted, and a receiving part configured to abut against the front end of the card.

12. The card connector according to claim 11, wherein the first side edge is further provided with a holding part that is configured to abut against a second side of the card upon being improperly inserted, so that the card is supported by the receiving part and the holding part.

* * * * *